US007564432B1

(12) United States Patent
Steffensmeier et al.

(10) Patent No.: US 7,564,432 B1
(45) Date of Patent: Jul. 21, 2009

(54) METHOD AND APPARATUS FOR EXTENDING THE LIFE OF MATRIX ADDRESSED EMISSIVE DISPLAY DEVICES

(75) Inventors: Martin J. Steffensmeier, Cedar Rapids, IA (US); Randy A. Naeve, Cedar Rapids, IA (US); Thomas C. Rohr, Hiawatha, IA (US); Linley E. Woelk, Marion, IA (US)

(73) Assignee: Rockwell Collins, Inc., Ceder Rapids, IA (US)

( * ) Notice: Subject to any disclaimer, the term of this patent is extended or adjusted under 35 U.S.C. 154(b) by 2091 days.

(21) Appl. No.: 09/648,830

(22) Filed: Aug. 25, 2000

(51) Int. Cl.
*G09G 3/22* (2006.01)
*H04N 3/20* (2006.01)
*G06F 3/048* (2006.01)

(52) U.S. Cl. ....................... 345/75.2; 348/173; 715/867

(58) Field of Classification Search .................. 345/77, 345/54, 691, 36, 45, 682, 618, 628, 636, 345/74.1, 75.1, 75.2, 76, 60–68, 204; 348/173, 348/445, 380, 556–558; 715/867
See application file for complete search history.

(56) References Cited

U.S. PATENT DOCUMENTS 4,127,796 A * 11/1978 Henderson .................. 315/395
4,677,430 A * 6/1987 Falkman et al. ............. 345/682
5,790,096 A * 8/1998 Hill, Jr. ...................... 345/600
5,821,917 A * 10/1998 Cappels ...................... 345/589
5,900,851 A * 5/1999 Toffolo et al. ................. 345/76
6,151,001 A * 11/2000 Anderson et al. ............. 345/63
6,262,772 B1 * 7/2001 Shen et al. .................. 348/445
6,369,851 B1 * 4/2002 Marflak et al. .............. 348/173
6,392,695 B1 * 5/2002 Watamoto et al. ........... 348/173
6,486,900 B1 * 11/2002 Shen et al. .................. 345/867

FOREIGN PATENT DOCUMENTS

JP 406332418 A * 12/1994

* cited by examiner

*Primary Examiner*—Kevin M Nguyen
(74) *Attorney, Agent, or Firm*—Daniel M. Barbieri

(57) ABSTRACT

A method of reducing luminance decay of emissive elements in a matrix addressed emissive display device includes generating control data corresponding to a static image to be displayed on a matrix of individually addressable emissive display elements. Drive signals are generated as a function of the control data, and are provided to the matrix to thereby energize the corresponding emissive display elements of the matrix in order to display the static image on the matrix. The control data are altered substantially continuously in order to substantially continuously move the static image on the matrix.

11 Claims, 6 Drawing Sheets

METHOD AND APPARATUS FOR EXTENDING THE LIFE OF MATRIX ADDRESSED EMISSIVE DISPLAY DEVICES

FIELD OF THE INVENTION

The present invention relates to matrix addressed emissive display devices. More particularly, the present invention relates to methods and apparatus which can be used to reduce luminance decay of emissive elements in matrix addressed emissive display devices.

BACKGROUND OF THE INVENTION

Matrix addressed emissive display devices utilize a matrix or array of emissive display elements or pixels which are individually controllable to display an image. Matrix addressed emissive display devices include, for example, light emitting diode (LED) displays, field effect displays (FEDs), and plasma displays. A common type of matrix addressed emissive display device is an LED display device utilizing organic light emitting diodes.

Decay of the emissive elements of emissive display devices occurs with usage. In particular, matrix emissive display devices which are used to continuously or frequently display static images will experience decay of the emissive elements more rapidly. Static images will be retained on matrix type emissive display devices in time, due to luminance decay of the emissive elements.

While techniques such as line translation have been used to slow the decay of emissive elements in cathode ray tube (CRT) display devices which display static images such as vertical or horizontal lines, techniques for slowing or preventing the decay of emissive elements in matrix addressed emissive display devices have been generally unavailable. Therefore, a method for extending the life of emissive display elements in matrix addressed emissive display devices would be a significant improvement in the art.

SUMMARY OF THE INVENTION

A method of reducing luminance decay of emissive elements in a matrix addressed emissive display device includes generating control data corresponding to a static image to be displayed on a matrix of individually addressable emissive display elements. Drive signals are generated as a function of the control data, and are provided to the matrix to thereby energize the corresponding emissive display elements of the matrix in order to display the static image on the matrix. The control data are altered substantially continuously in order to substantially continuously move the static image on the matrix.

DETAILED DESCRIPTION OF AN ILLUSTRATIVE EMBODIMENT

Figure 1:
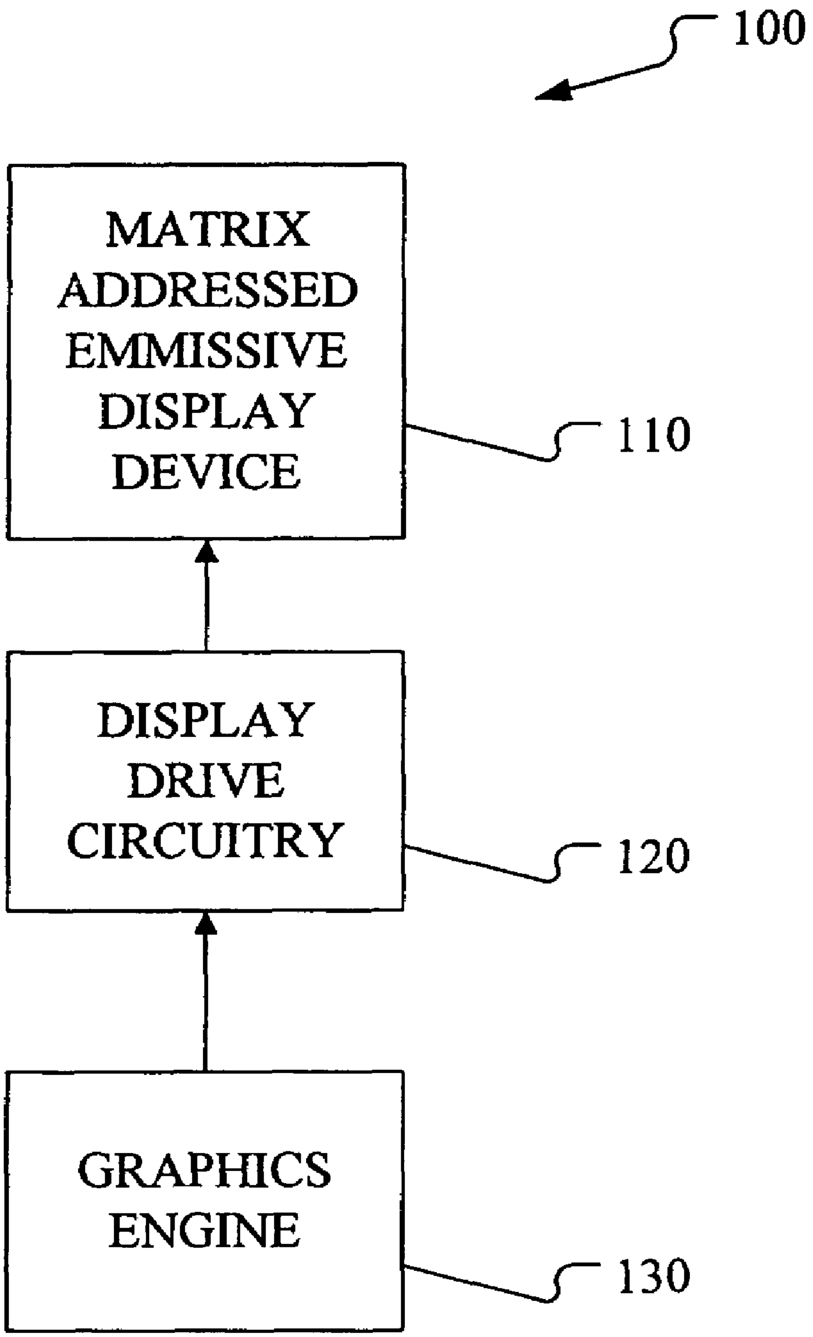
FIG. 1 is a block diagram illustrating a display system having a matrix emissive display device which is controlled in accordance with embodiments of the invention.

FIG. 1 is a block diagram illustrating display system 100 in accordance with embodiments of the present invention. Display system 100 includes a matrix addressed emissive display device 110, display drive circuitry 120 and a graphics engine 130. Matrix emissive display device 110 is a FED, a plasma display, an LED display, or other types of emissive display devices which utilize a matrix of individually controllable emissive display elements or pixels. Display drive circuitry 120 includes circuitry of the type known in the art which is used to individually energize the emissive display elements in matrix emissive display device 110 in order to display an image on the matrix of emissive elements.

Graphics engine 130 is a microprocessor or microprocessor based system adapted to generate the data required to control display drive circuitry 120 to display a particular image on matrix emissive display device 110. Thus, graphics engine 130 ultimately controls the operation of display drive circuitry 120 to affect the luminous intensity of each individual emissive display element or pixel of display device 110 in order to provide the desired image thereon. Graphics engine 130 also controls display drive circuitry 120 to thereby reduce or delay decay of the emissive elements of display device 110 in accordance with the invention as described below.

FIGS. 2A-2D are diagrammatic illustrations of matrix addressed emissive display device 110. These FIGS. provide a general illustration of a method of the present invention of reducing or delaying decay of the emissive elements in the matrix emissive display device. As shown in FIGS. 2A-2D, display device 110 includes matrix 210 of individually controllable emissive elements or pixels. As is known in the art, matrix 210 of display device 110 will include multiple row conductors (not shown) and column conductors (not shown) arranged such that each individual emissive element can be controlled using a corresponding set of conductors including at least one specific row conductor and at least one specific column conductor.

Figure 2B:
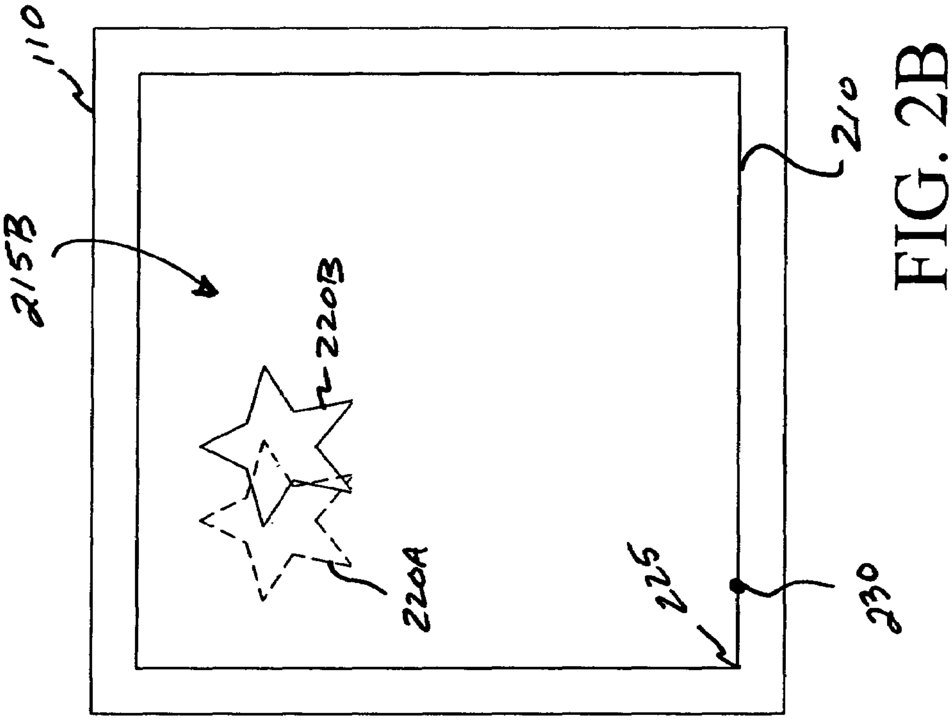
FIGS. 2A-2D are diagrammatic representations of the matrix emissive display device shown in FIG. 1, which illustrate a method of extending the life of emissive display elements in accordance with the invention.
Figure 2A:
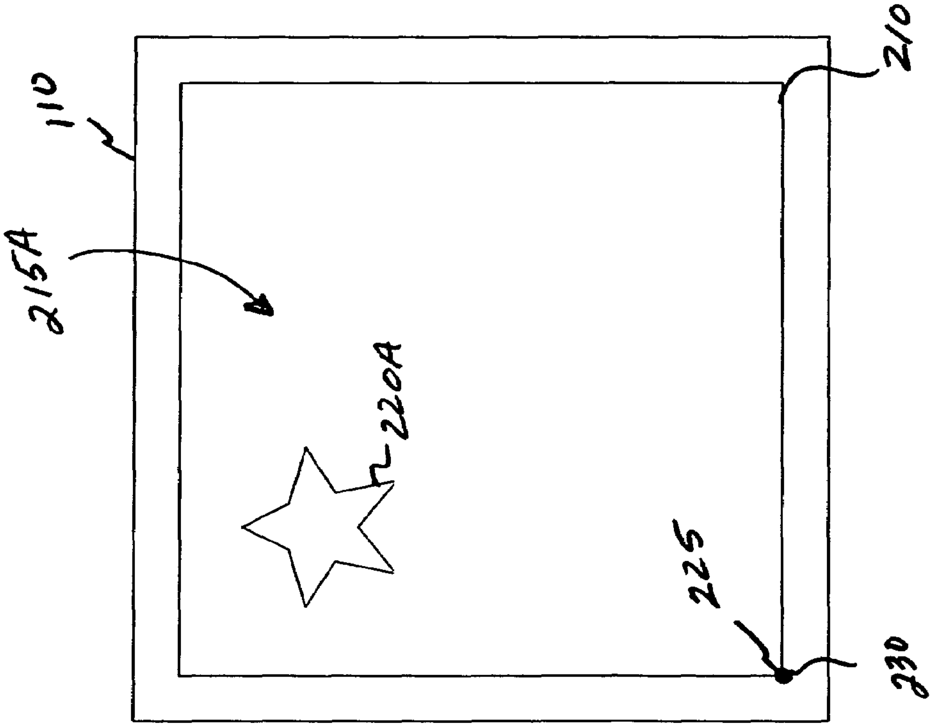

In FIG. 2A, matrix 210 is used to display image 215A. In image 215A provided in FIG. 2A, as an example, an object (a star in this particular example) is displayed at a first location 220A. The object is displayed by controlling the luminous intensity of the emissive elements in the area of object position 220A relative to the luminous intensity of other emissive elements in matrix 210.

In some embodiments, a display origin 225 can be defined. The display origin, which is shown by way of example as being positioned in the lower left hand corner of matrix 210, can be used as a reference point for determining the location of all emissive elements in the matrix. For example, if desired, position 225 can correspond to an emissive element which is controlled using a first row conductor and a first column conductor. All other emissive elements are controlled using one of the sequentially ordered row conductors and one of the sequentially ordered column conductors. In these embodiments, an image origin 230 (illustrated as a dot in FIGS. 2A-2D) can be defined as well. As shown in FIG. 2A, the image origin can be initially defined as being positioned at the display origin 225. However, the image origin can be defined as being positioned at any other location in the matrix 220 as well. In these embodiments, the positional difference in position between the display origin 225 and the image origin 230 is known. Generally, both display origin 225 and image origin 230 can be positioned anywhere. However, the relative positions must be known.

In accordance with the present invention, image 215A shown on matrix 210 can be very slowly translated within the active area of matrix 210 in such a way that the movement will not be noticeable or annoying to the viewer, and such that the emissive elements will not always be required to be "on" or at "full intensity." In one embodiment, this is accomplished by graphics engine 130 re-defining the position of origin 230 of the image to be displayed. Graphics engine 130 then accordingly generates new data for controlling drive circuitry 120.

For example, in FIG. 2B, origin 230 is moved horizontally to the right of display origin 225. The result is that image 215B, which is a horizontally translated version of image 215A, will be shown on matrix 210 of display device 110. This is demonstrated in FIG. 2B by the new object location 220B of the star. Movement of the image between FIGS. 2A and 2B is shown in an exaggerated manner for sake of illustration of the methods of the invention. However, as discussed above, the image will be slowly translated within the active area (i.e., within matrix 210 of emissive elements) in such a way that the movement will not be noticeable to the viewer. Further, in addition to the fact that movement of the object in FIG. 2B from object location 220A to object location 220B is exaggerated, movement will occur incrementally in as small of steps as is reasonably possible (for example, one emissive element at a time horizontally or vertically) in order to avoid detection by the viewer.

Figure 2D:
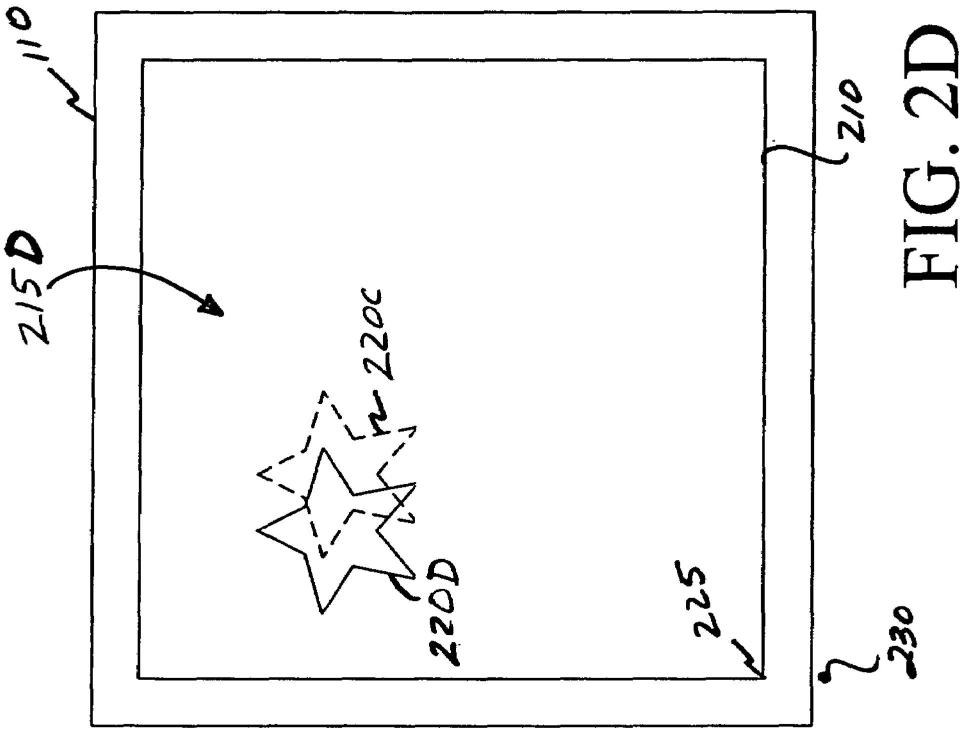
Figure 2C:
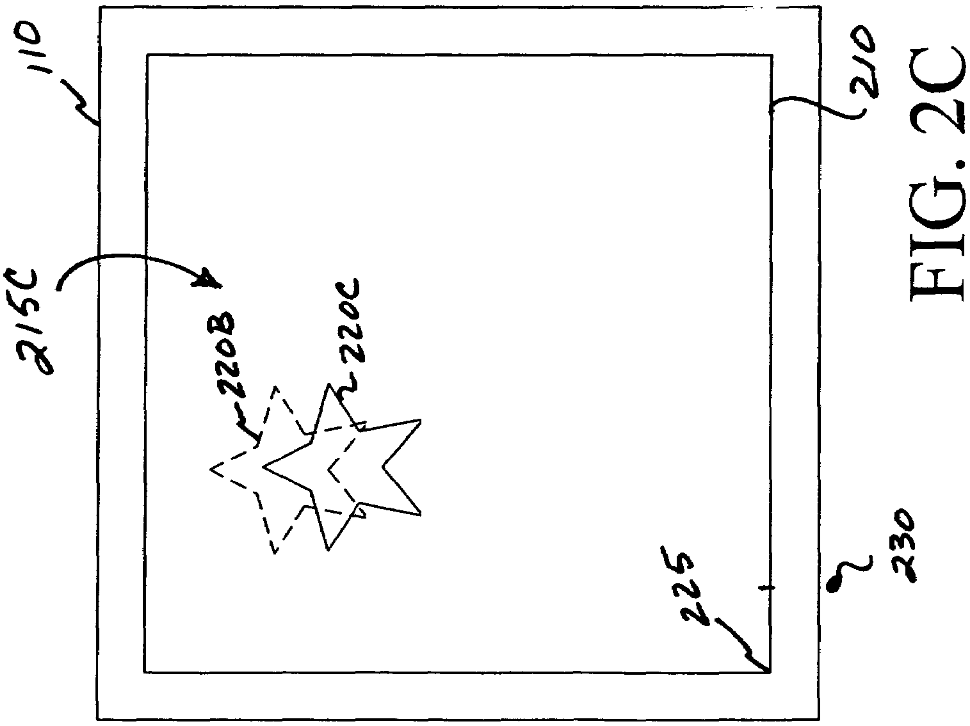

FIGS. 2C and 2D show further movement of the image such that new images 215C and 215D are the results, respectively. These movements are demonstrated in FIGS. 2C and 2D by the object moving from object position 220B to object position 220C, and by movement of the object from object position 220C to object position 220D. In embodiments of the invention, these new images 215C and 215D are produced by slowly translating image origin 230 vertically downward relative to display origin 225 (FIG. 2C), and then horizontally to the left relative to display origin 225 (FIG. 2D). This further illustrates that image origins can be moved to "negative" space relative to the matrix 210.

Figure 3A:
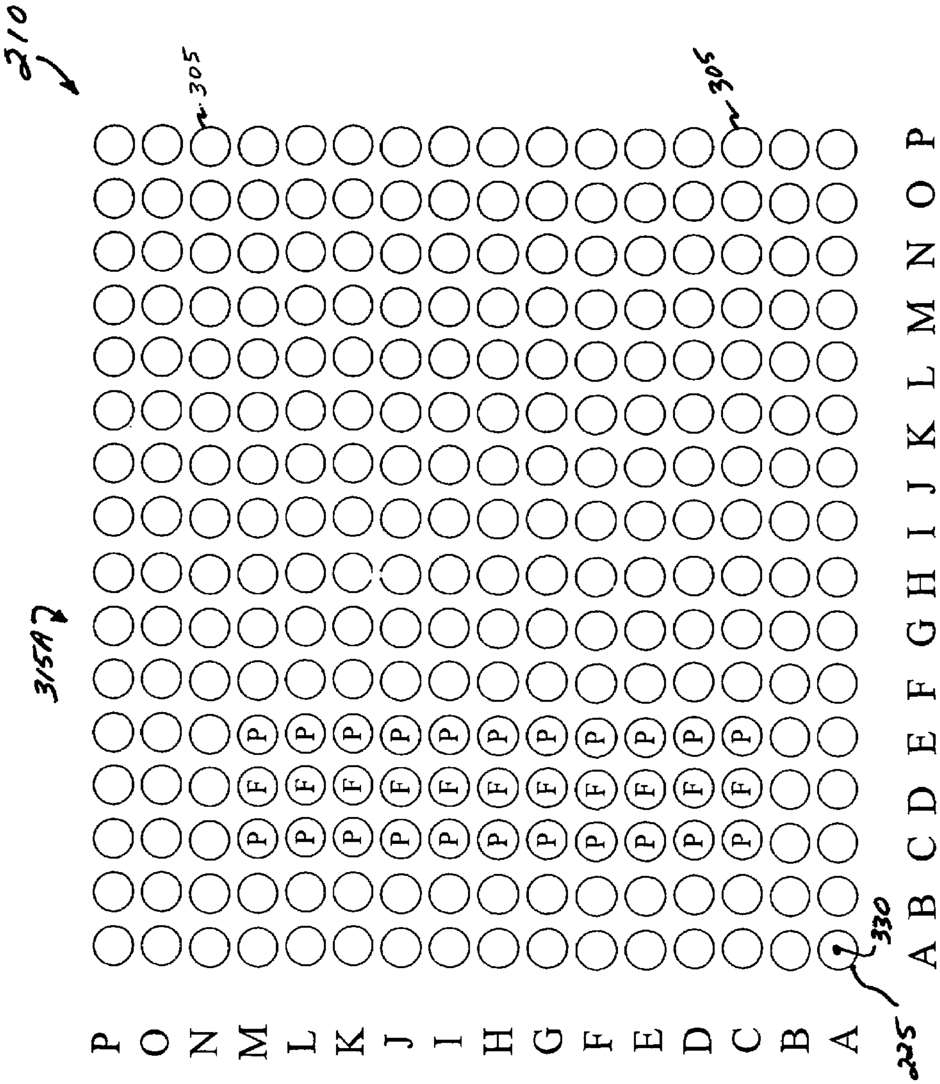
FIGS. 3A-3C are diagrammatic representations of the matrix emissive display device shown in FIG. 1, which illustrate the matrix of addressable emissive display elements and provide an example of the methods of the present invention.
Figure 3B:
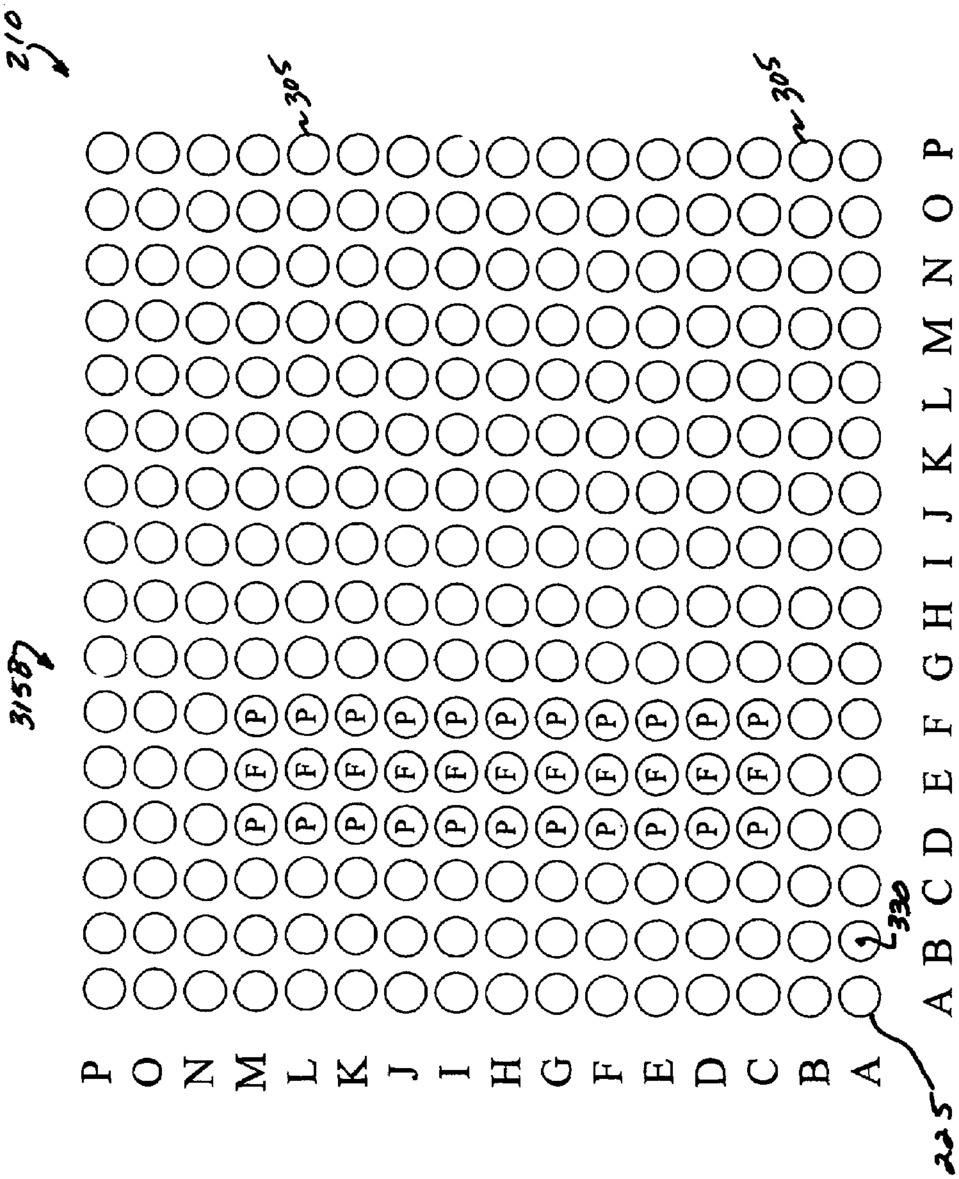
Figure 3C:
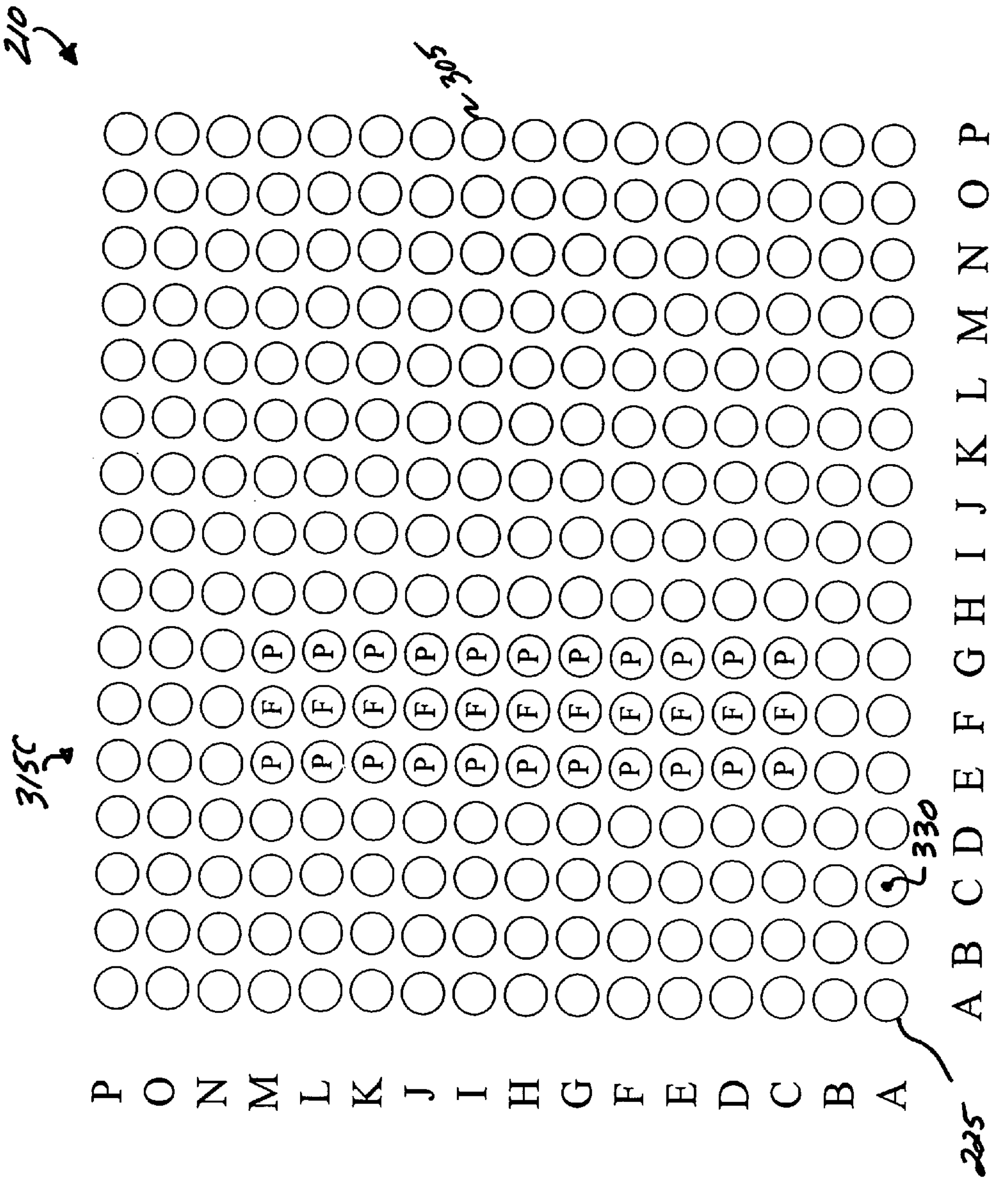

FIGS. 3A-3C provide a more detailed example of the methods of the present invention. In each of FIGS. 3A-3C, a portion of matrix 210 of emissive elements is shown. In this particular embodiment, each individual emissive element 305 is positioned at a particular location, within matrix 210, which is defined by a particular column and a particular row. In the portion of matrix 210 illustrated in FIG. 2A, columns of emissive elements (labeled A-P) and rows of emissive elements (labeled A-P) are shown.

It must be noted that in emissive display devices, the matrix of emissive elements need not necessarily be lined up in conventional rows or columns as shown in FIG. 3A. Instead, the emissive elements in a "column" or "row" can be offset horizontally or vertically from each other. Further, in color displays, each of the emissive elements shown can be replaced with multiple sub-pixels or sub-emissive elements, each corresponding to a different color. For example, each of emissive elements or pixels 305 can include three smaller emissive elements or pixels, one corresponding to each of the red, green and blue colors for example in an RGB color system. The methods of the present invention described generally with reference to FIGS. 3A-3C are applicable to these embodiments as well.

In FIG. 3A, image 315A shown on matrix 210 includes a line segment formed by all of the emissive elements 305 in columns C-E, between row C and row M. The emissive elements labeled "P" are indicative of emissive elements which are controlled to generate a partial luminous intensity (less than full intensity), while emissive elements labeled "F" are indicative of emissive elements which are controlled to be at full luminous intensity. Image 315A is shown, by way of example, as having image origin 330 positioned at display origin 225.

In FIG. 3B, image 315A has moved to form image 315B having image origin 330 translated horizontally to the right by one column. As a result, the line segment now occupies emissive elements in columns D-F between row C and row M. Consequently, the partially illuminated emissive elements in column C shown in FIG. 3A are now no longer illuminated, while the fully illuminated pixel elements in column D shown in FIG. 3A are now only partially illuminated.

As shown in FIG. 3C, the image has moved to form new image 315C having image origin 330 again shifted horizontally to the right by one additional column relative to display origin 225. At this point, the emissive elements in column D are no longer illuminated, while the full illumination of emissive elements is moved to column F. In this manner, the continuous and slow translation of the image remains unnoticeable to the viewer, but eliminates the need for particular emissive elements to be continuously "on" or at "full intensity". The translation of the image can be controlled by graphics engine 130 and display drive circuitry 120 in accordance with any desired pattern. For example, instead of translating the image only horizontally or only vertically at any instance, the image can be translated horizontally by one emissive element and vertically by one emissive element at the same time.

Although the present invention has been described with reference to illustrative embodiments, workers skilled in the art will recognize that changes may be made in form and detail without departing from the spirit and scope of the invention.

What is claimed is:

1. A method of reducing luminance decay of emissive elements in a matrix addressed emissive display device, the method comprising:

generating in a graphics engine control data corresponding to a static image to be displayed and generating drive signals as a function of the control data in a drive circuit, wherein the control data defines an image origin of the static image with respect to a display origin;

providing the drive signals to the matrix to thereby energize the corresponding emissive display elements of the matrix in order to display the static image on the matrix; and altering in the graphics engine the control data, substantially continuously, such that the drive signals are substantially continuously altered to thereby substantially continuously move the static image on the matrix in a manner which is substantially undetectable to viewers of the display device, wherein the control data is altered by redefining the image origin of the static image with respect to the display origin, wherein providing the drive signals to the matrix further comprises providing the drive signals to a field effect display matrix in order to display the static image on the matrix.

2. The method of claim 1 wherein generating control data corresponding to the static image to be displayed on the matrix of individually addressable emissive display elements further comprises:

defining the image origin for the static image;

assigning the image origin for the static image to an emissive display element in the matrix; and generating the control data for each emissive display element in the matrix based upon its respective position relative to the emissive display element to which the image origin has been assigned.

3. The method of claim 2, wherein assigning the image origin further comprises initially assigning the image origin for the static image to the display origin.

4. The method of claim 3, wherein altering the control data further comprises reassigning the image origin for the static image to a different emissive display element in the matrix such that the image origin moves relative to the display origin.

5. A matrix addressed emissive display device, comprising:

a matrix of individually addressable emissive display elements;

a graphics engine adapted to generate control data corresponding to a static image to be displayed on the matrix; and display drive circuitry coupled to the graphics engine and adapted to generate drive signals as a function of the control data, the drive signals being provided to the matrix to thereby energize the corresponding emissive display elements of the matrix in order to display the static image on the matrix, wherein the graphics engine alters the control data, substantially continuously, such that the drive signals are substantially continuously altered to thereby substantially continuously move the static image on the matrix in a manner which is substantially undetectable to viewers of the display device, and wherein the matrix is a field effect display matrix.

6. The matrix addressed emissive display device of claim 5, wherein the graphics engine is adapted to define an image origin for the static image and to assign the image origin for the static image to an emissive display element in the matrix, the graphics engine is further adapted to generate control data for each emissive display element in the matrix based upon its respective position relative to the emissive display element to which the image origin has been assigned.

7. The matrix addressed emissive display device of claim 6, wherein the graphics engine is adapted to initially assign the image origin for the static image to a display origin.

8. The matrix addressed emissive display device of claim 7, wherein the graphics engine is further adapted to alter the control data to substantially continuously move the static image on the matrix by substantially continuously reassigning the image origin for the static image to a different emissive display element in the matrix such that the image origin moves relative to the display origin.

9. A matrix addressed emissive display device, comprising:

a matrix of individually addressable emissive display elements; and graphics means for controlling the matrix to display a static image on the matrix and to substantially continuously move the static image on the matrix in a manner which is substantially undetectable to viewers of the display, device wherein the graphic means includes a graphic engine means for generating control data associated with the static image, the image having an image origin and wherein the graphics means includes a display driver means for driving the display elements in response to the graphic engine means, wherein the graphic engine means redefines the image origin to move the static image, wherein the matrix is a field effect display matrix.

10. The matrix addressed emissive display device of claim 9, wherein the graphics means is adapted to define the image origin for the static image and to assign the image origin for the static image to an emissive display element in the matrix, the graphics means further adapted to generate control data for each emissive display element in the matrix based upon its respective position relative to the emissive display element to which the image origin has been assigned.

11. The matrix addressed emissive display device of claim 10, wherein the graphics means is adapted to initially assign the image origin for the static image to a display origin and wherein the graphics means is further adapted to alter the control data to substantially continuously move the static image on the matrix by substantially continuously reassigning the image origin for the static image to a different emissive display element in the matrix such that the image origin moves relative to the display origin.

* * * * *